(12) United States Patent
Praszczalek et al.

(10) Patent No.: US 11,985,125 B2
(45) Date of Patent: May 14, 2024

(54) BIOMETRICALLY-ENHANCED VERIFIABLE CREDENTIALS

(71) Applicant: MASTERCARD INTERNATIONAL INCORPORATED, Purchase, NY (US)

(72) Inventors: Przemek Praszczalek, Irvington, NY (US); Raman Narayanswamy, Nashua, NH (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 386 days.

(21) Appl. No.: 17/325,804

(22) Filed: May 20, 2021

(65) Prior Publication Data
US 2021/0367938 A1 Nov. 25, 2021

Related U.S. Application Data

(60) Provisional application No. 63/030,136, filed on May 26, 2020, provisional application No. 63/027,919, filed on May 20, 2020.

(51) Int. Cl.
*H04L 29/06* (2006.01)
*G06K 19/06* (2006.01)
*H04L 9/40* (2022.01)

(52) U.S. Cl.
CPC .... *H04L 63/0861* (2013.01); *G06K 19/06037* (2013.01)

(58) Field of Classification Search
None
See application file for complete search history.

(56) References Cited

U.S. PATENT DOCUMENTS

| 10,110,574 | B1 | 10/2018 | Ziraknejad |
| 2005/0246291 | A1 | 11/2005 | Delgrosso et al. |
| 2006/0083228 | A1* | 4/2006 | Ong ................. H04L 63/0823 370/389 |

(Continued)

FOREIGN PATENT DOCUMENTS

EP  3647977 A1  5/2020

OTHER PUBLICATIONS

International Search Report and Written Opinion for Application No. PCT/US2021/033295 dated Sep. 6, 2021 (10 pages).

*Primary Examiner* — Piotr Poltorak
(74) *Attorney, Agent, or Firm* — Michael Best & Friedrich LLP

(57) ABSTRACT

Biometrically-enhanced verifiable credentials of an individual. In one embodiment, an electronic device including a biometric capture circuitry, a memory, and an electronic processor. The biometric capture circuitry configured to capture one or more biometrics of an individual. The memory storing a digital identity application. The electronic processor, when executing the digital identity application, is configured to receive the one or more biometrics of the individual that are captured by the biometric capture circuitry, generate a biometric token of the individual based on the one or more biometrics, receive identity information of the individual, generate biometrically-enhanced verifiable credentials including the identity information and the biometric token, and control the memory to store the biometrically-enhanced verifiable credentials.

8 Claims, 12 Drawing Sheets

(56) References Cited

U.S. PATENT DOCUMENTS

| | | | |
|---|---|---|---|
| 2010/0005520 A1* | 1/2010 | Abbot | G06Q 30/0255 |
| | | | 709/227 |
| 2017/0094514 A1* | 3/2017 | Kelts | H04W 12/08 |
| 2018/0096325 A1* | 4/2018 | Panzo | G06Q 20/3278 |
| 2018/0167386 A1* | 6/2018 | Bhatt | G06F 21/32 |
| 2019/0325125 A1* | 10/2019 | Pantfoerder | H04W 8/005 |
| 2020/0019682 A1* | 1/2020 | Lee | H04L 63/0853 |
| 2020/0145219 A1 | 5/2020 | Sebastian et al. | |

\* cited by examiner

Figure 5 Basic components of a verifiable credential

Figure 5 Basic components of a verifiable credential

Figure 5 Basic components of a verifiable credential

Figure 5 Basic components of a verifiable credential

Figure 5 Basic components of a verifiable credential

Figure 5 Basic components of a verifiable credential

Figure 5 Basic components of a verifiable credential

BIOMETRICALLY-ENHANCED VERIFIABLE CREDENTIALS

CROSS-REFERENCE TO RELATED APPLICATIONS

This application claims the benefit of U.S. Provisional Application No. 63/027,919, filed on May 20, 2020 and U.S. Provisional Application No. 63/030,136, filed on May 26, 2020, the entire contents of which are hereby incorporated by reference.

FIELD OF THE INVENTION

The present disclosure relates generally to verifiable credentials. More specifically, the present disclosure relates to biometrically-enhanced verifiable credentials.

BACKGROUND

A verifiable credential (also referred to herein as "VC") is a set of tamper-proof claims and metadata that cryptographically prove who issued the verifiable credential. One example standard for a verifiable credential is the Global Verifiable Credential Standard (W3C) that includes credential metadata, claims, and proof(s).

A VC issuer issues the VC to a VC holder after verifying identifiers and use schemas associated with the VC holder in a verifiable data registry of the VC. The VC holder acquires the VC from the VC issuer with the identifiers and the use schemas registered in the verifiable data registry, and presents the VC to a VC verifier. The VC verifier requests the VC from the VC holder to verify a claim made by the VC holder. The VC verifier then uses the VC to verify the claim by verifying the identifiers and use schemas stored in the verifiable data registry.

SUMMARY

The devices, systems, and methods of the present disclosure strengthen the level of assurance/trust in a verifiable credential by introducing a second layer of biometrically-enhanced security associated with a verifiable credential (referred to herein as "biometrically-enhanced verifiable credential"). The introduction of the second layer of biometrically-enhanced security also enables a method for individuals (whom the verifiable credential actually describes "subject") to claim a proof of ownership of that verifiable credential.

With respect to a first improvement, the biometrically-enhanced verifiable credentials of the present disclosure improves fraud prevention related to a signed verifiable credential in situation, especially where a loss of private key signing the verifiable credential has occurred. With respect to a second improvement, the biometrically-enhanced verifiable credentials of the present disclosure allows individuals to create "self-attested" verifiable credentials, where the authenticating service knows that the verifiable credential originated from the individual.

With respect to a third improvement, the biometrically-enhanced verifiable credentials of the present disclosure may use biometric tokens embedded in the verifiable credential. The embedded biometric tokens preserve the privacy of the verifiable credential holder and/or subject that cannot be accomplished with the conventional use of biometric templates or raw images. A biometric token is a one-way, irreversible transformation of a biometric image and/or a biometric template.

A biometric token is different from the biometric image and/or the biometric template because the biometric token, while it may be considered personally identifiable information, is not sensitive personally identifiable information as the biometric token requires additional information for biometric identification of an individual and cannot be used for anything other than biometric identification by the originator of the biometric token. The biometric image and/or the biometric template in conventional use are sensitive personally identifiable information because the biometric image and/or the biometric template may be used to identify an individual without requiring any additional information.

The use of raw, encrypted biometric images of any kind (not just facial images) offers little to no protection and risks exposing sensitive personal data about the individual (which cannot be changed like a password). Also, inclusion of encrypted biometric templates in the verifiable credentials may prove problematic, because encryption may be broken at some point in the future, so storing encrypted biometric templates in a verifiable credential that may "live" for a very long time, is not secure. The irreversible biometric tokens described herein are both secure and do not expose sensitive personal data about the individual.

In one embodiment, the present disclosure includes an electronic device. The electronic device includes a biometric capture circuitry, a memory, and an electronic processor communicatively connected to the memory and the biometric capture circuitry. The biometric capture circuitry is configured to capture one or more biometrics of an individual. The memory stores a digital identity application. The electronic processor, when executing the digital identity application, is configured to receive the one or more biometrics of the individual that are captured by the biometric capture circuitry, generate a biometric token of the individual based on the one or more biometrics, receive identity information of the individual, generate biometrically-enhanced verifiable credentials including the identity information and the biometric token, and control the memory to store the biometrically-enhanced verifiable credentials.

In another embodiment, the present disclosure includes a non-transitory computer-readable medium storing instructions that, when executed by an electronic processor, cause the electronic processor to perform a set of operations. The set of operations includes receiving one or more biometrics of an individual that are captured by a biometric capture circuitry. The set of operations includes generating a biometric token of the individual based on one or more biometrics. The set of operations includes receiving identity information of the individual. The set of operations includes generating biometrically-enhanced verifiable credentials including the identity information and the biometric token. The set of operations also includes controlling a memory to store the biometrically-enhanced verifiable credentials.

In yet another embodiment, the present disclosure includes a system including a network, a server, and a first electronic device communicatively connected to the network. The server including a first communication interface configured to communicate with the network, a first electronic processor, and a first memory including a verifiable credential collection and issuance program and a global ledger. The first electronic processor, when executing the verifiable credential collection and issuance program, is configured to receive biometrically-enhanced verifiable credentials of an individual from the first electronic device via the first communication interface and the network, the biometrically-enhanced verifiable credentials includes a biometric token, determine whether a second biometric token in a global ledger matches the biometric token, responsive to determining that the second biometric token in the global ledger matches the biometric token, control the first memory to store the biometrically-enhanced verifiable credentials in an account in the global ledger, the account including the second biometric token, and responsive to determining that all biometric tokens in the global ledger do not match the biometric token, control the first memory to create a new account in the global ledger and store the biometrically-enhanced verifiable credentials in the new account.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
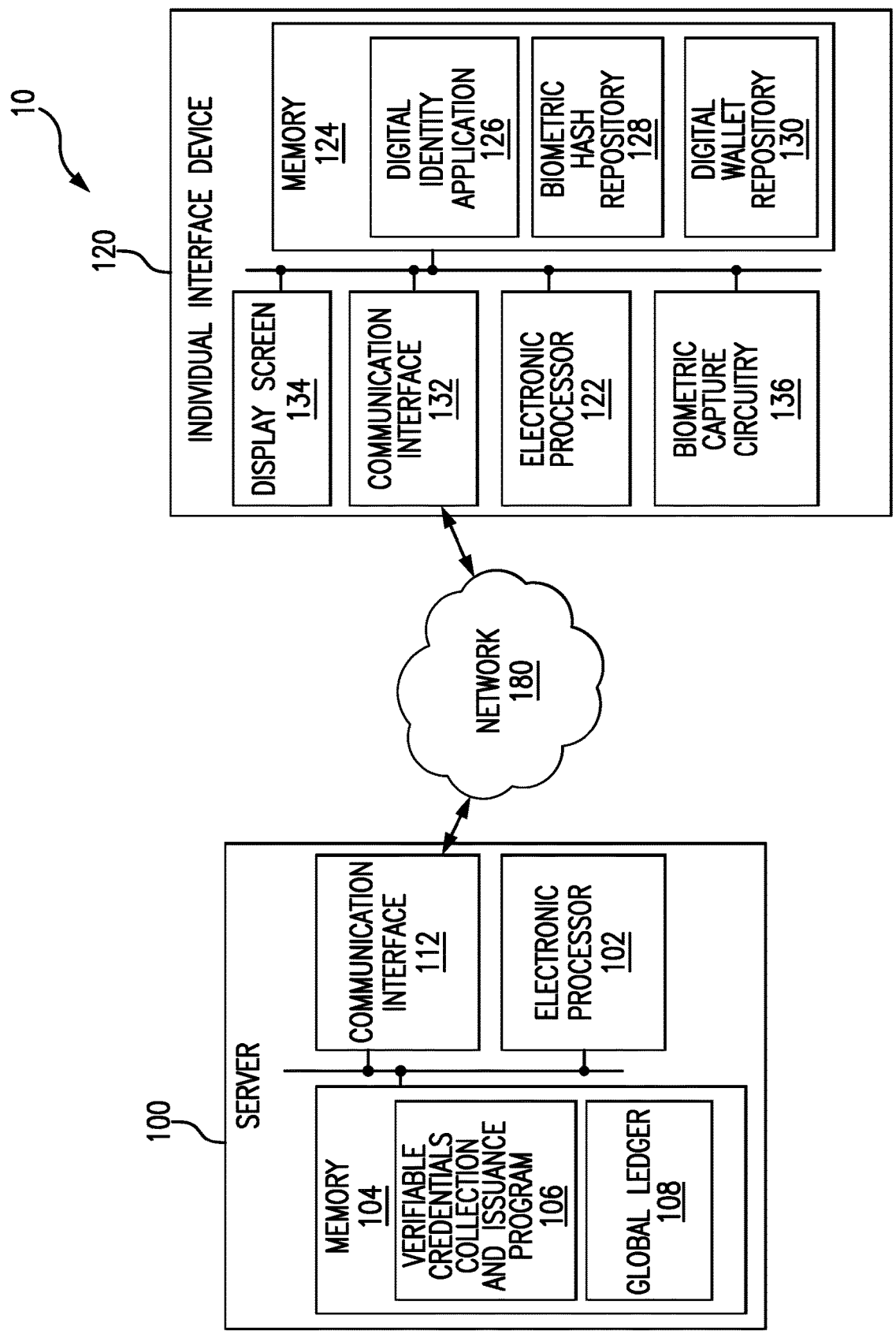
FIG. 1 is a block diagram illustrating a system that provides biometrically-enhanced verifiable credentials of an individual, in accordance with various aspects of the present disclosure.

FIG. 1 is a block diagram illustrating a system that provides biometrically-enhanced verifiable credentials of an individual, in accordance with various aspects of the present disclosure. It should be understood that, in some embodiments, there are different configurations from the configuration illustrated in FIG. 1. The functionality described herein may be extended to any number of servers providing distributed processing.

In the example of FIG. 1, the system 10 includes a server 100, an individual interface device 120, and a network 180. The server 100 includes an electronic processor 102 (for example, a microprocessor or another suitable processing device), a memory 104 (for example, a non-transitory computer-readable medium or a non-transitory computer-readable storage medium), and a communication interface 112. It should be understood that, in some embodiments, the server 100 may include fewer or additional components in configurations different from that illustrated in FIG. 1. Also the server 100 may perform additional functionality than the functionality described herein. In addition, the functionality of the server 100 may be incorporated into other servers. As illustrated in FIG. 1, the electronic processor 102, the memory 104, and the communication interface 112 are electrically coupled by one or more control or data buses enabling communication between the components.

The electronic processor 102 executes machine-readable instructions stored in the memory 104. For example, the electronic processor 102 may execute instructions stored in the memory 104 to perform the functionality described herein.

The memory 104 may include a program storage area (for example, read only memory (ROM)) and a data storage area (for example, random access memory (RAM), and other non-transitory, machine-readable medium). In some examples, the program storage area may store machine-executable instructions regarding an available resources and options collection program 106 (hereinafter "verifiable credentials collection and issuance program 106"). In some examples, the data storage area may store data regarding a global ledger 108.

The verifiable credentials collection and issuance program 106 causes the electronic processor 102 to collect or issue verifiable credentials of an individual, the verifiable credentials of the individual being stored in the global ledger 108. In some examples, the verifiable credentials collection and issuance program 106 causes the electronic processor 102 to collect and update an individual's personal data account (e.g., identification verifiable credentials or payment verifiable credentials) based on inputs received from an external device. For example, the electronic processor 102 may receive the aforementioned inputs from an individual to update the global ledger 108 via the individual interface device 120 and the network 180.

In some examples, the global ledger 108 is a central repository of verifiable credentials regarding a plurality of individuals. Each of the verifiable credentials is associated with a biometric token of a specific individual. The verifiable credentials may be updated periodically with the verifiable credentials collection and issuance program 106.

The biometric token of the specific individual is also not reflective of any sensitive PII. Sensitive PII is any information that may be used to identify an individual without additional information (e.g., an individual's social security number, an individual's name and date-of-birth, an individual's address, an individual's driver license number, an individual's passport number, an individual's different biometrics, or other suitable sensitive PII). The biometric token of the specific individual may instead be indicative of non-sensitive personally identifiable information that requires additional information (e.g., a unique tokenization algorithm applied to an individual's different biometrics).

The communication interface 112 receives data from and provides data to devices external to the server 100, such as the individual interface device 120 via the network 180. For example, the communication interface 112 may include a port or connection for receiving a wired connection (for example, an Ethernet cable, fiber optic cable, a telephone cable, or the like), a wireless transceiver, or a combination thereof. In some examples, the communication interface includes an radio frequency identifier (RFID) reader. In some examples, the network 180 is the Internet.

In the example of FIG. 1, the individual interface device 120 (also referred to herein as "an electronic device" or "a display device") includes an electronic processor 122 (for example, a microprocessor or another suitable processing device), a memory 124 (for example, a non-transitory computer-readable storage medium), a communication interface 132, a display screen 134, and a biometric capture circuitry 136. It should be understood that, in some embodiments, the individual interface device 120 may include fewer or additional components in configurations different from that illustrated in FIG. 1. Also the individual interface device 120 may perform additional functionality than the functionality described herein. In addition, some of the functionality of the individual interface device 120 may be incorporated into other servers (e.g., incorporated into the server 100). As illustrated in FIG. 1, the electronic processor 122, the memory 124, the communication interface 132, the display screen 134, and the biometric capture circuitry 136 are electrically coupled by one or more control or data buses enabling communication between the components.

The electronic processor 122 executes machine-readable instructions stored in the memory 124. For example, the electronic processor 122 may execute instructions stored in the memory 124 to perform the functionality described herein.

The memory 124 may include a program storage area (for example, read only memory (ROM)) and a data storage area (for example, random access memory (RAM), and other non-transitory, machine-readable medium). The program storage area includes a digital identity application 126. In some examples, the digital identity application 126 may be a standalone application. In other examples, the digital identity application 126 is a feature that is part of a separate application (e.g., the digital identity application 126 may be included as part of a camera application, a banking application, or other suitable application). The data storage area includes a biometric token repository 128 and a digital wallet repository 130.

The digital identity application 126 causes the electronic processor 122 to generate a biometric token from the biometric information captured by the biometric capture circuitry 136. For example, when the biometric capture circuitry 136 is a camera, the digital identity application 126 causes the electronic processor 122 to generate a biometric token from an individual's facial image captured by the camera. The biometric token may be generated by a unique biometric tokenization algorithm, e.g., a biometric algorithm developed by TrustStamp®.

In some examples, the digital identity application 126 causes the electronic processor 122 to control the biometric token repository 128 to temporarily store the biometric token. In other examples, the digital identity application 126 causes the electronic processor 122 to control the biometric token repository 128 to permanently store the biometric token. The digital identity application 126 also causes the electronic processor 122 to store any identity information of the individual in the digital wallet repository 130.

The digital identity application 126 also causes the electronic processor 122 to generate biometrically-enhanced verifiable credentials based on the identity information of the individual and the biometric token that is generated and stored in the biometric token repository 128. Responsive to generating the biometrically-enhanced verifiable credentials, the digital identity application 126 causes the electronic processor 122 to output the biometrically-enhanced verifiable credentials to the server 100.

The digital identity application 126 causes the electronic processor 122 to generate one or more graphical user interfaces. The digital identity application 126 also causes the electronic processor 122 to control the display screen 134 to display the one or more graphical user interfaces. In some examples, the individual interface device 120 is a smartphone and the display screen 134 is a presence-sensitive display screen.

In some examples, the individual interface device 120 includes one or more user interfaces (not shown). The one or more user interfaces include one or more input mechanisms (for example, a touch screen, a keypad, a button, a knob, and the like), one or more output mechanisms (for example, a display, a speaker, and the like), or a combination thereof. The one or more optional user interfaces receive input from a user (e.g., an individual), provide output to a user, or a combination thereof. In some examples, as an alternative to or in addition to managing inputs and outputs through the one or more optional user interfaces, the individual interface device 120 may receive user input, provide user output, or both by communicating with an external device (e.g., the server 100) over a wired or wireless connection.

The communication interface 132 receives data from and provides data to devices external to the individual interface device 120, i.e., the server 100. For example, the communication interface 132 may include a port or connection for receiving a wired connection (for example, an Ethernet cable, fiber optic cable, a telephone cable, or the like), a wireless transceiver, or a combination thereof. In some examples, the communication interface 132 may be communicatively connected to the communication interface 112 via a backhaul (not shown).

The display screen 134 is an array of pixels that generates and outputs images including information regarding the biometric token to a user. In some examples, the display screen 134 is one of a liquid crystal display (LCD) screen, a light-emitting diode (LED) and liquid crystal display (LCD) screen, a quantum dot light-emitting diode (QLED) display screen, an interferometric modulator display (IMOD) screen, a micro light-emitting diode display screen (mLED), a virtual retinal display screen, or other suitable display screen.

The biometric capture circuitry 136 is any electronic circuitry that is configured to capture one or more biometric characteristics of an individual. For example, the biometric capture circuitry 136 may be a camera with an image sensor that generates and outputs image data of the individual. In some examples, the image sensor may be a semiconductor charge-coupled device (CCD) image sensor, a complementary metal-oxide-semiconductor (CMOS) image sensor, or other suitable image sensor. The electronic processor 122 receives the biometric data of the subject that is output by the biometric capture circuitry 136.

Figure 2:
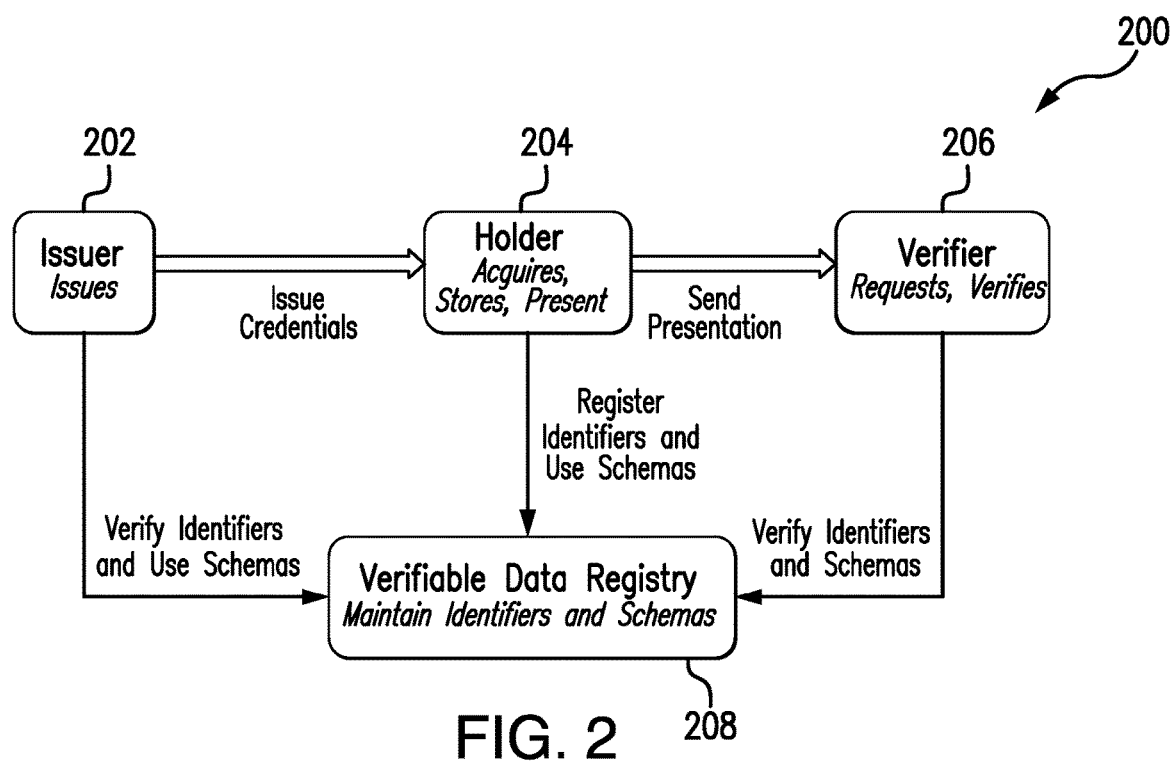
FIG. 2 is a flow diagram illustrating an information flow with respect to a verifiable data registry, in accordance with various aspects of the present disclosure.

FIG. 2 is a flow diagram illustrating an information flow 200 with respect to a verifiable data registry, in accordance with various aspects of the present disclosure. In the example of FIG. 2, the information flow 200 includes an issuer 202, a holder 204, a verifier 206, and a verifiable data registry 208.

The issuer 202 issues the verifiable credentials to the holder 204. The issuer 202 may also verify identifiers and use schemas with the verifiable data registry 208.

The holder 204 acquires the verifiable credentials from the issuer 202, registers the identifiers and use schemas with the verifiable data registry 208, and makes a claim to the verifier 206 and presents the verifiable credentials to the verifier 206 in response to a request by the verifier 206.

The verifier 206 receives a claim from the holder 204 and requests proof of the claim. The verifier 206 receives the verifiable credentials in response to the request and verifies the verifiable credentials with the verifiable data registry.

Figure 3:
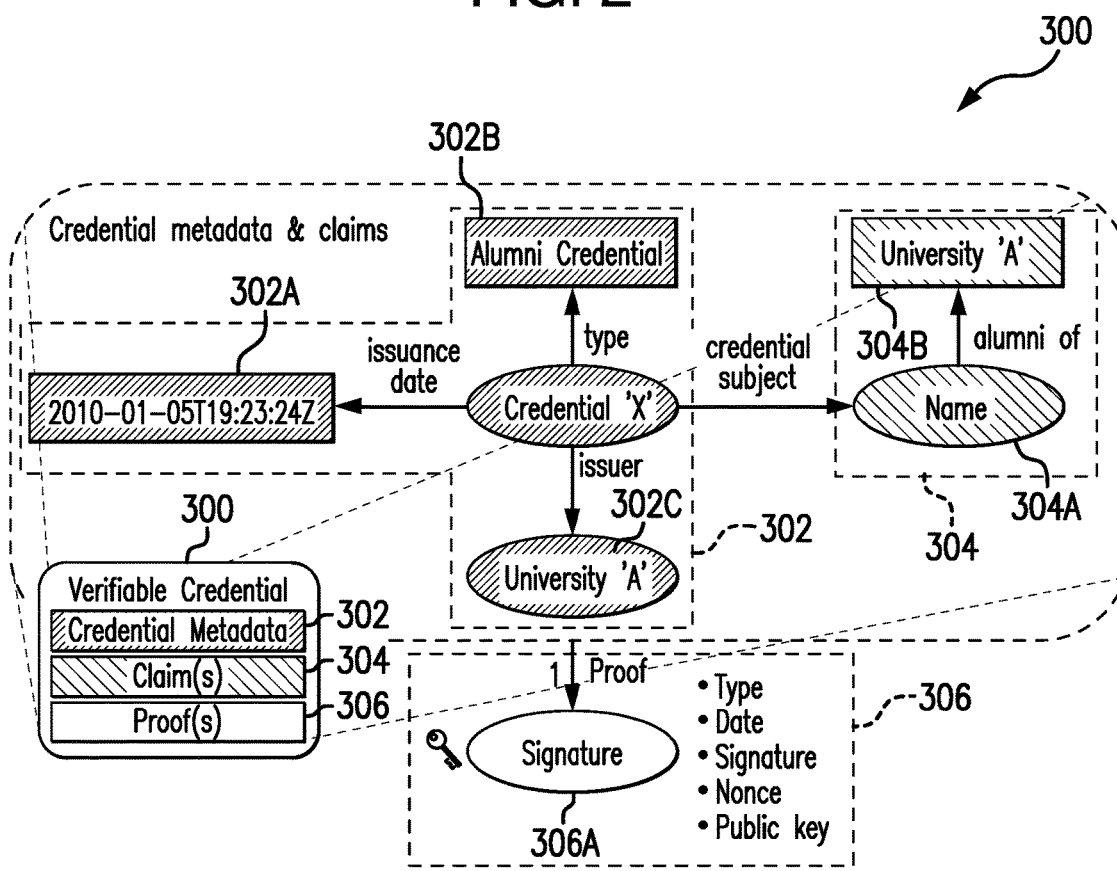
FIG. 3 is a diagram illustrating a typical structure of the Global Verifiable Credential Standard (W3C).

FIG. 3 is a diagram illustrating a typical structure of the Global Verifiable Credential Standard (W3C) 300. As illustrated in FIG. 3, the verifiable credential 300 includes credential metadata 302, claim 304, and proof(s) 306.

The credential metadata 302 (i.e., Credential "X") includes an issuance date 302A, a type of credential 302B, and an issuer of the credential 302C. In this example implementation, the issuance date is 2010-01-05T19:23:24Z, the type of credential is Alumni credential, and the issuer of the credential is University "A."

The claim 304 includes a credential subject 304A, an attribute 304B of the credential subject. In this example implementation, the credential subject 304A is a name, the attribute 304B of the credential subject is that the name is an alumni of University "A."

The proof 306 includes a proof of knowledge 306A. In this example implementation, the proof of knowledge 306A is a signature associated with the credential metadata that proves the claims 304. In some examples, the signature 306A may be a type, date, digital representation of physical signature, nonce, public key, or other suitable signature information.

Figure 4:
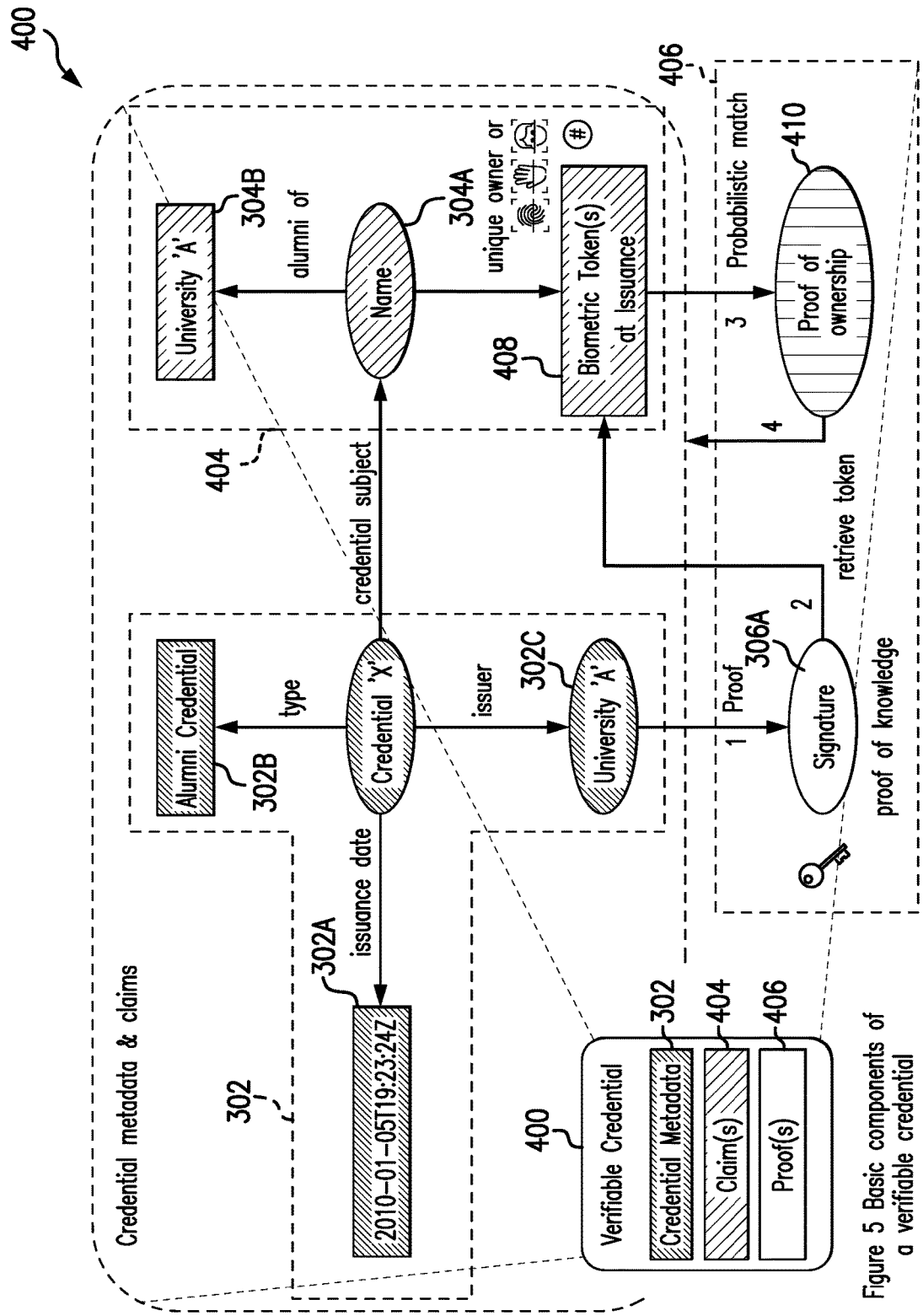
FIG. 4 is a diagram illustrating a first example structure of biometrically-enhanced verifiable credentials, in accordance with various aspects of the present disclosure.

FIG. 4 is a diagram illustrating a first example structure of biometrically-enhanced verifiable credentials 400, in accordance with various aspects of the present disclosure. As illustrated in FIG. 4, the verifiable credentials 400 includes the credential metadata 302, claim 404, and proof(s) 406.

The claim 404 includes the credential subject 304A, the attribute 304B of the credential subject, and a biometric token 408 at issuance of the credential metadata of the credential subject. In this example implementation, the biometric token 408 is proof that the name with respect to the credential subject 304A is the unique owner of the verifiable credential 400.

The proof 406 includes the proof of knowledge 306A and a proof of ownership 410. In this example implementation, the proof of ownership 410 is a biometric signature associated with the credential metadata that proves the claim 404.

As illustrated in FIG. 4, the credential metadata 302 is used to prove the claims 404. The proof of the claim 404 also requires retrieval of the biometric token 408. The biometric token 408 is used to perform a probabilistic match on a presenter of the verifiable credential 400. Lastly, the probabilistic match is proof of the proof of ownership 410 that the presenter of the verifiable credential 400 is the owner of the verifiable credential 400.

Figure 5:
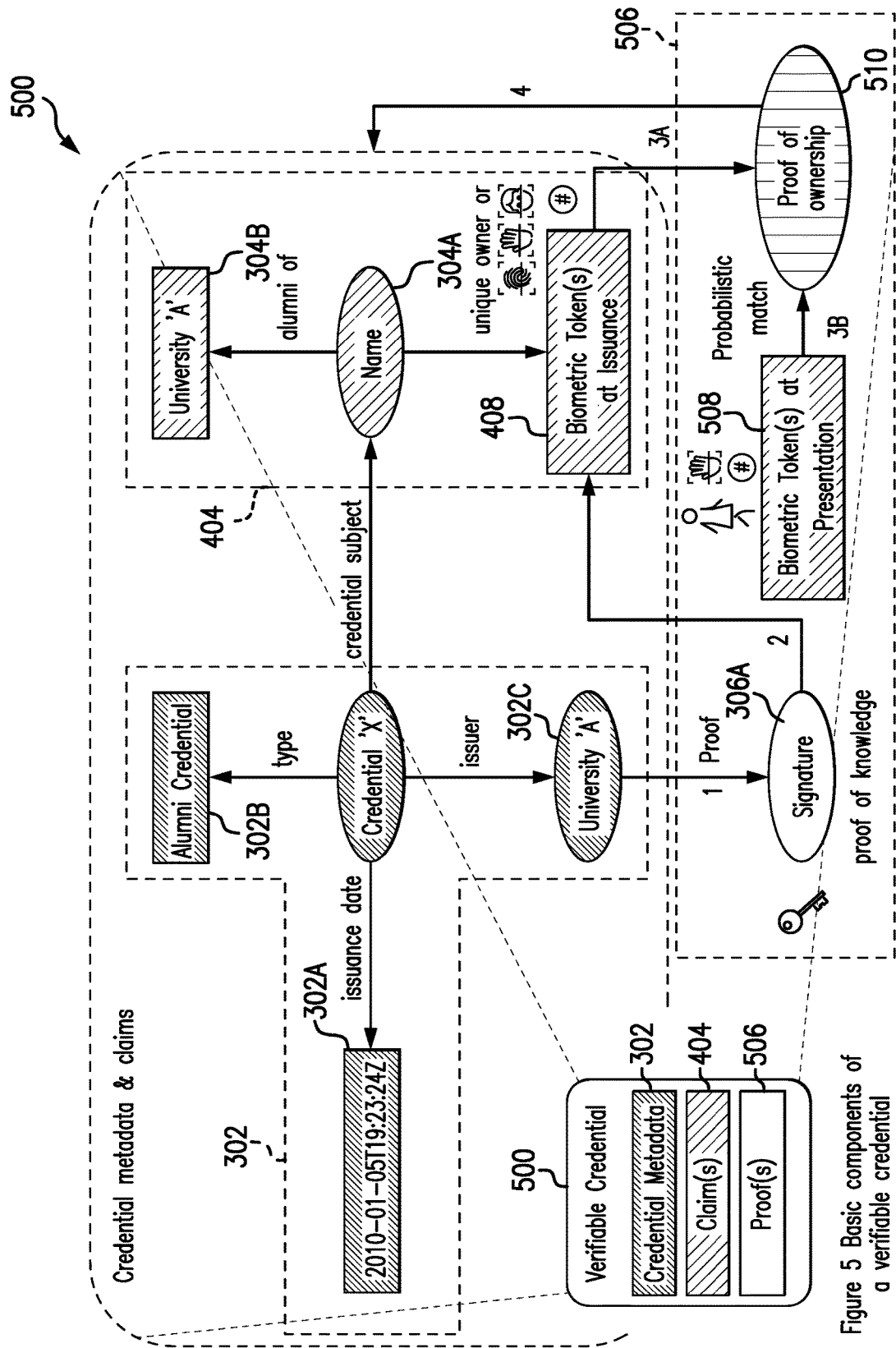
FIG. 5 is a diagram illustrating a second example structure of biometrically-enhanced verifiable credentials, in accordance with various aspects of the present disclosure.

FIG. 5 is a diagram illustrating a second example structure of biometrically-enhanced verifiable credentials 500, in accordance with various aspects of the present disclosure. As illustrated in FIG. 5, the verifiable credential 500 includes the credential metadata 302, the claim 404, and proof(s) 506.

The proofs 506, unlike the proofs 306 and 406, further includes an external biometric token that is presented at the time of the claim 508 are made with the verifiable credential 500. Therefore, the probabilistic match that is proof (i.e., link 4) of the proof of ownership 510 includes both a probabilistic match (i.e., links 3A and 3B) between the internal biometric token at issuance (i.e., the biometric token 408) and the external biometric token(s) at presentation (i.e., the biometric token 508).

Figure 6:
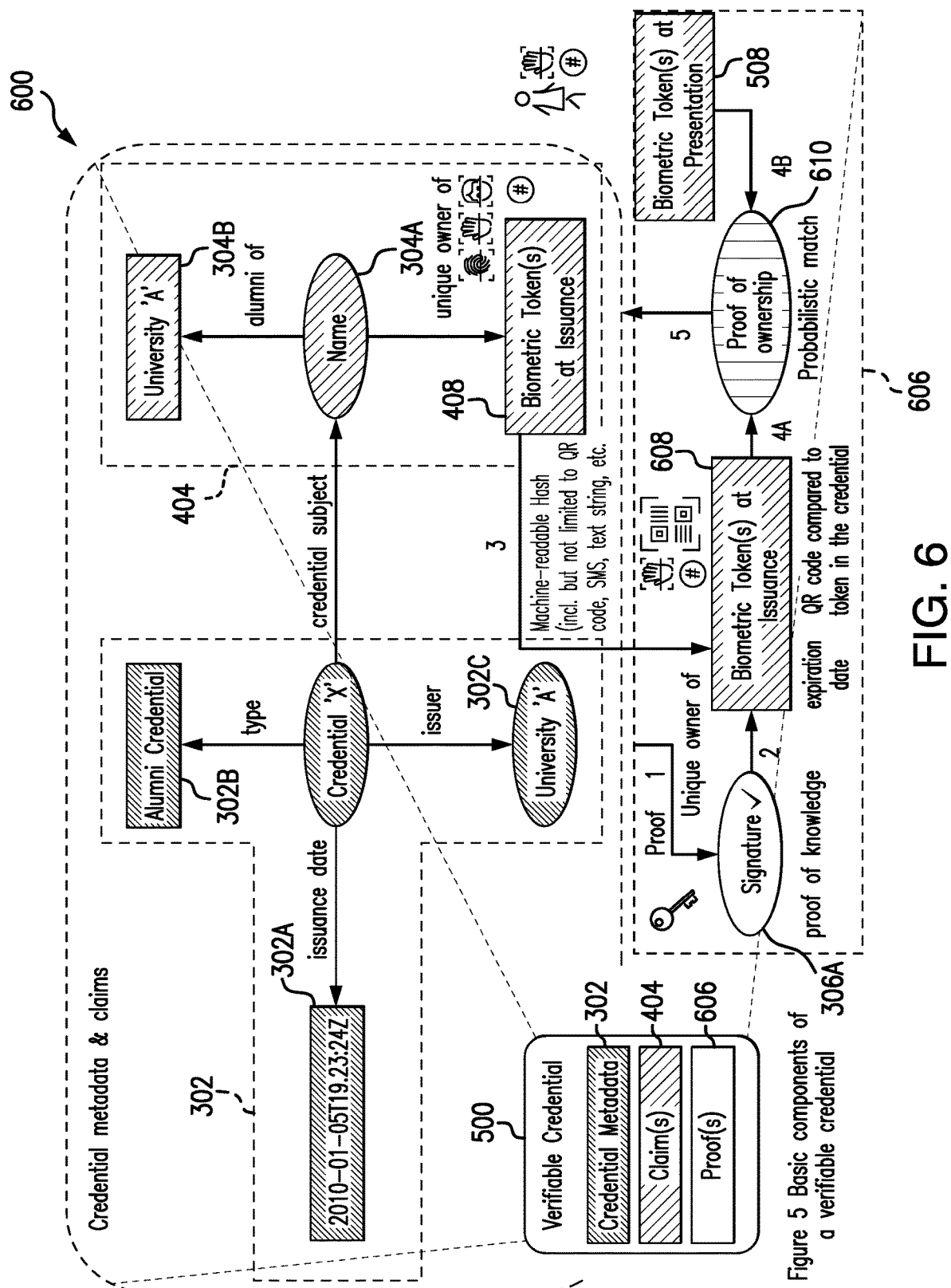
FIG. 6 is a diagram illustrating a third example structure of biometrically-enhanced verifiable credentials, in accordance with various aspects of the present disclosure.

FIG. 6 is a diagram illustrating a third example structure of biometrically-enhanced verifiable credentials 600, in accordance with various aspects of the present disclosure. As illustrated in FIG. 6, the verifiable credential 600 includes the credential metadata 302, the claim 404, and proof(s) 606.

The proofs 606, unlike the proofs 306-506, further includes an external biometric token at issuance 608 in addition to the external biometric token at presentation 508, where both match the internal biometric token at issuance 408 and within the verifiable credential 600. Therefore, the probabilistic match that is proof of the proof of ownership 610 includes a probabilistic match between the external biometric token at issuance 608 and the external biometric token(s) at presentation 508 (i.e., links 4A and 4B).

In some examples, the external biometric token at issuance 608 is QR code or other machine-readable medium that is indicative of the internal biometric token at issuance 408 and within the verifiable credential 600. In other examples, the external biometric token at issuance 608 may have an expiration date.

Figure 7:
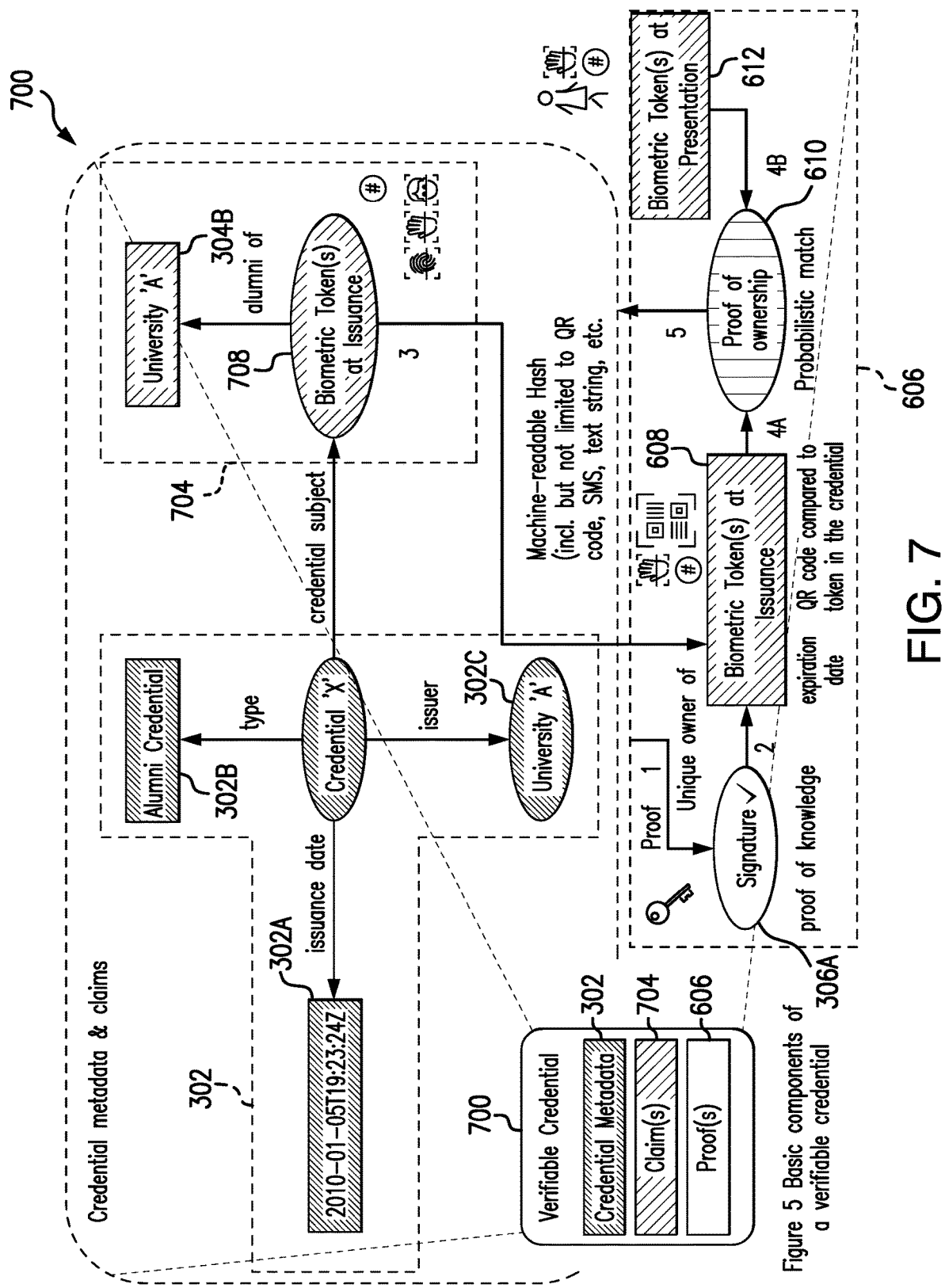
FIG. 7 is a diagram illustrating a fourth example structure of biometrically-enhanced verifiable credentials, in accordance with various aspects of the present disclosure.

FIG. 7 is a diagram illustrating a fourth example structure of biometrically-enhanced verifiable credentials 700, in accordance with various aspects of the present disclosure. As illustrated in FIG. 7, the verifiable credential 700 includes the credential metadata 302, claim 704, and the proof(s) 606.

The claim 704 includes a credential subject 708, and the attribute 304B of the credential subject 708. In this example implementation, the credential subject 708 is a biometric token at issuance 708, the attribute of the credential subject 708 is that the biometric token at issuance 708 is an alumni of University "A," and the biometric token at issuance 708 is proof that the holder of the verifiable credential 700 is an alumni of University "A."

The claim 704 do not include the claim of a "name," but instead, uses the biometric token at issuance 708 in place of the "name." The claim 704 allow a holder of the verifiable credential 700 to prove the relationship of the biometric token's owner to the claim 704, without additional metadata describing the true owner, e.g., the owner's "name."

Figure 8:
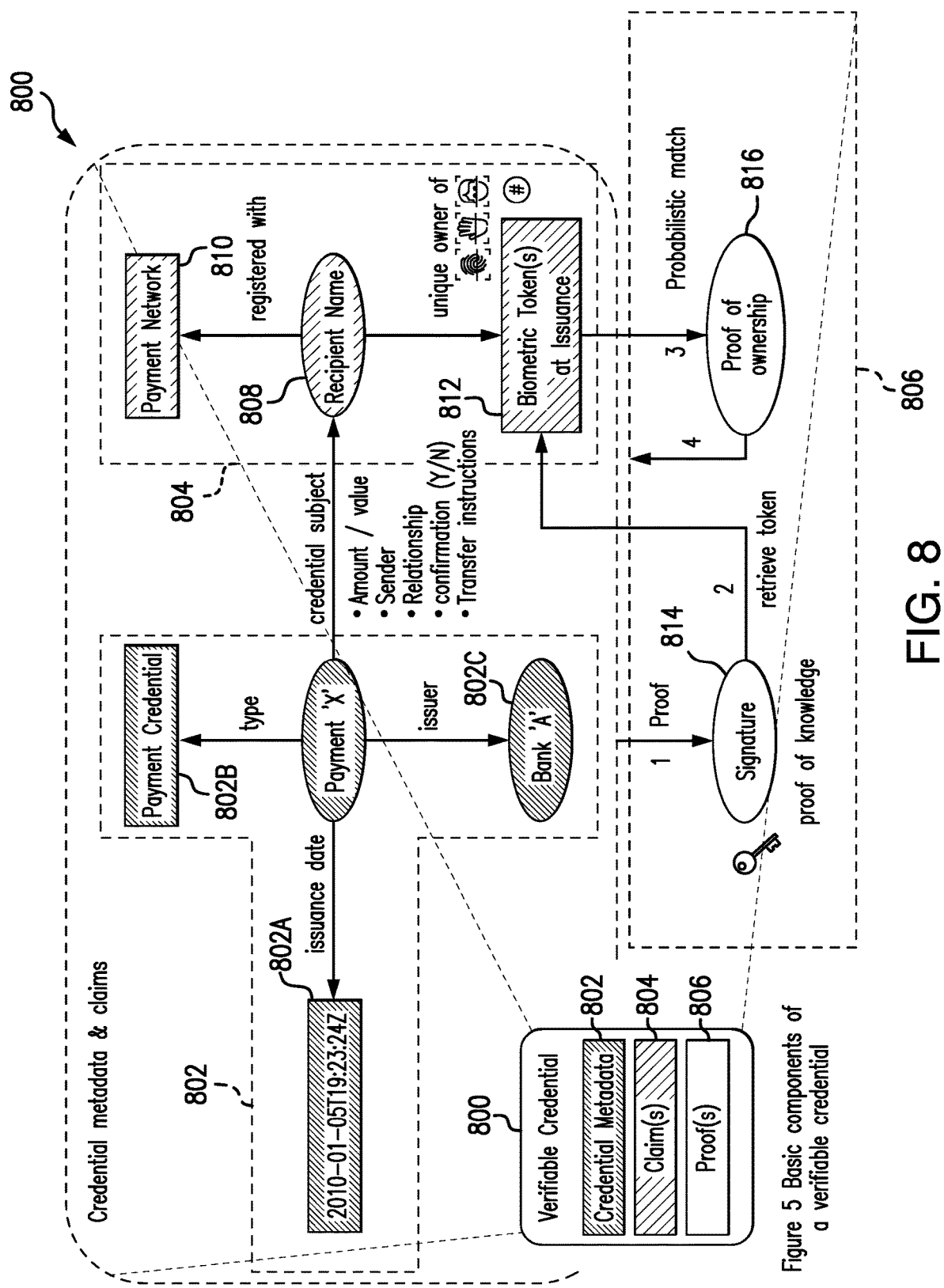
FIG. 8 is a diagram illustrating a first example structure of biometrically-enhanced verifiable credentials for payments, in accordance with various aspects of the present disclosure.

FIG. 8 is a diagram illustrating a first example structure of biometrically-enhanced verifiable credentials 800 for payments, in accordance with various aspects of the present disclosure. As illustrated in FIG. 8, the verifiable credential 800 includes credential metadata 802, claim 804, and proof(s) 806.

The credential metadata 802 (i.e., Payment "X") includes an issuance date 802A, a type of credential 802B, and an issuer of the credential 802C. In this example implementation, the issuance date 802A is 2010-01-05T19:23:24Z, the type of credential 802B is a Payment credential, and the issuer of the credential 802C is Bank "A."

The claim 804 includes a credential subject 808, an attribute 810 of the credential subject, and a biometric token at issuance 812 of the credential metadata of the credential subject 808. In this example implementation, the credential subject 808 is a Recipient name, the attribute of the credential subject 810 is that the name of the Payment Network, and the biometric token at issuance 812 is proof that the Recipient name is the unique owner of the credential metadata 802.

The proof 806 includes a proof of knowledge 814 and a proof of ownership 816. In this example implementation, the proof of knowledge 814 is a signature associated with the credential metadata 802 that proves the claim using the credential metadata 802 and the proof of ownership 816 is a biometric signature associated with the credential metadata 802 that proves the claim using the credential metadata 802.

Figure 9:
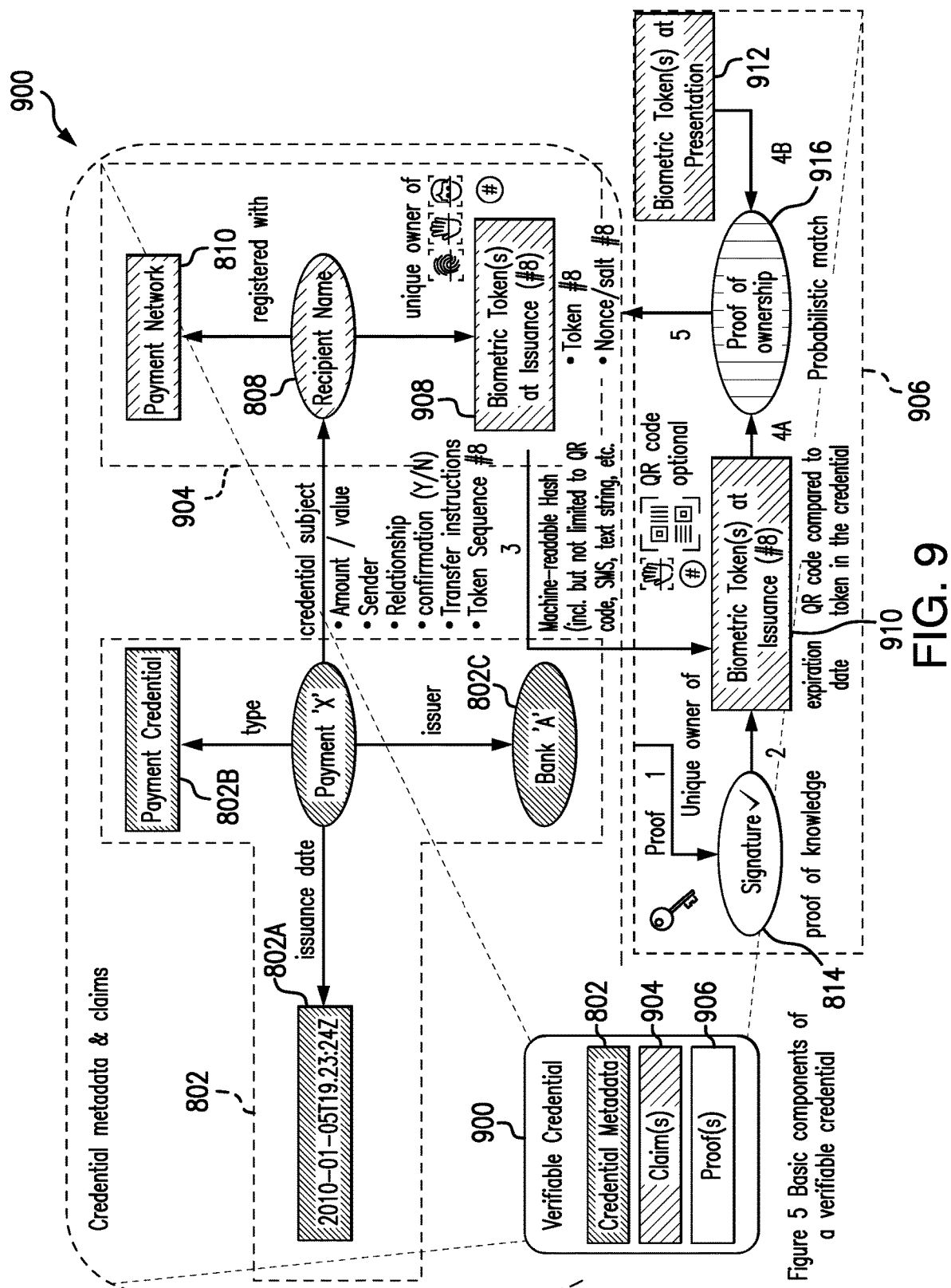
FIG. 9 is a diagram illustrating a second example structure of biometrically-enhanced verifiable credentials for payments, in accordance with various aspects of the present disclosure.

As illustrated in FIG. 9, the proofs 806 is used to prove the claims 804. Specifically, the biometric token at issuance 812 is used to perform a probabilistic match on a presenter of the biometrically-enhanced verifiable credentials 800. The probabilistic match is proof of the proof of ownership 816 that the presenter of the verifiable credential 800 is the owner of the verifiable credential 800.

FIG. 9 is a diagram illustrating a second example structure of biometrically-enhanced verifiable credentials 900 for payments, in accordance with various aspects of the present disclosure. As illustrated in FIG. 9, the verifiable credential 900 includes the credential metadata 802, claim 904, and proof(s) 906.

The claim 904 includes the credential subject 808, the attribute 810 of the credential subject 808, and an eighth biometric token at issuance 908 of the credential metadata of the credential subject 808. In this example implementation, the eighth biometric token at issuance 908 is proof that the Recipient name is the unique owner of the credential metadata 802.

The proof 906 includes a proof of knowledge 914 and a proof of ownership 916. In this example implementation, the proof of knowledge 914 is the signature 814 associated with the credential metadata 802 that proves the claim 904 and the proof of ownership 916 is a biometric signature that proves the claim using the credential metadata 802. The biometric signature is probabilistic matches between the biometric token at issuance 910 and the biometric token at presentation 912 (e.g., links 4A and 4B).

As illustrated in FIG. 9, the credential metadata 802 is used to prove the claims 904. The internal biometric token at issuance 908 may be provided as the eighth biometric token at issuance 910 to perform a probabilistic match on a presenter of the biometrically-enhanced verifiable credentials 800. In some examples, the eighth biometric token at issuance 910 may be a QR code, SMS, text string, or other machine-readable indicia.

Figure 10:
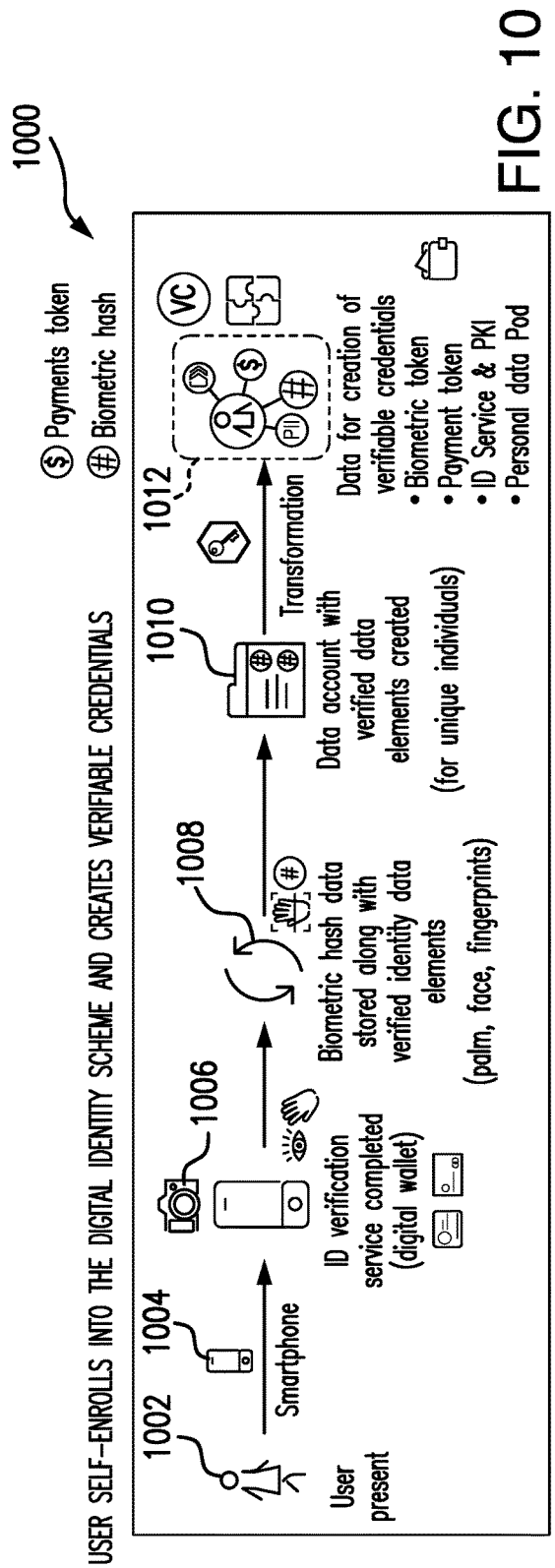
FIG. 10 is a flow diagram illustrating a system that enrolls an individual in a digital identity service and creates biometrically-enhanced verifiable credentials, in accordance with various aspects of the present disclosure.

FIG. 10 is a flow diagram illustrating a system 1000 that enrolls an individual in a digital identity service and creates biometrically-enhanced verifiable credentials, in accordance with various aspects of the present disclosure. As illustrated in FIG. 10, the system 1000 includes an individual 1002, a smartphone 1004, an identity verification service 1006, biometric token data 1008, a data account 1010, a personal data pod 1012, and a verifiable credential 1014.

In the example of FIG. 10, the individual 1002 uses the smartphone 1004 to perform an identity (ID) verification service 1006 that generates the biometric token data 1008 and stores the biometric token data 1008 along with other verified identity data elements in a data account 1010 locally and/or remotely. In some examples, the data account 1010 is created and transformed into a personal data pod 1012 that includes data for creation of verifiable credentials. In other examples, the data account 1010 already exists and the ID verification service 1006 identifies the personal data pod 1012 with the biometric token data 1008.

The ID verification service 1006, after creating or identifying the personal data pod 1012, creates the verifiable credential 1014 from various data stored in the personal data pod 1012. For example, the verifiable credential 1014 may include a payments token and the biometric token data 1008.

Figure 11:
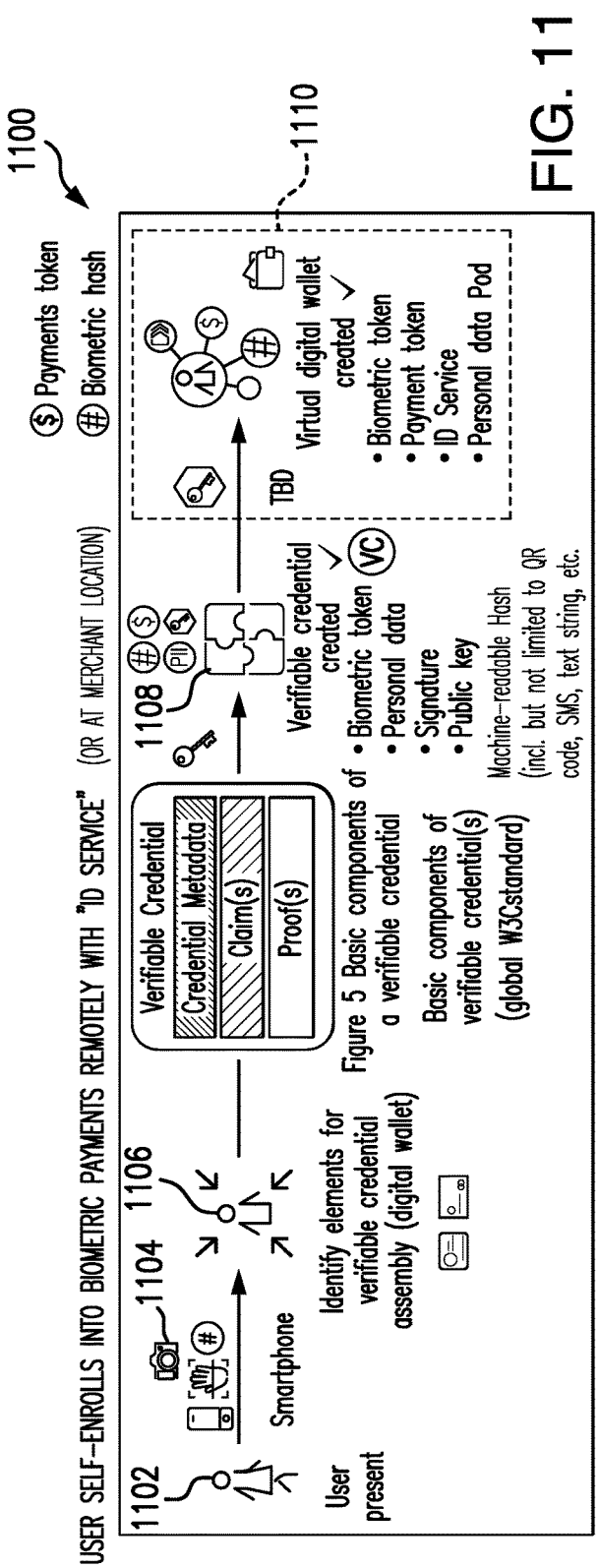
FIG. 11 is a flow diagram illustrating a system that enrolls an individual in biometric payments, in accordance with various aspects of the present disclosure.

FIG. 11 is a flow diagram illustrating a system 1100 that enrolls an individual in biometric payments, in accordance with various aspects of the present disclosure. As illustrated in FIG. 11, the system 1100 includes an individual 1102, a smartphone 1104, an identity verification service 1106, and a verifiable credential 1108. In some examples, as illustrated in FIG. 11, the system 1100 may optionally include the creation of a virtual digital wallet 1110.

In the example of FIG. 11, the individual 1102 uses the smartphone 1104 to perform an identity (ID) verification service 1106 that generates biometric token data and stores the biometric token data along with other verified identity data elements in a digital wallet locally and/or remotely (e.g., the optional virtual digital wallet 1110). The digital wallet is created and transformed into the verifiable credential 1108 that meets the global W3C standard and includes a payments token, the biometric token data, and the other verified identity data elements. In some examples, the verifiable credential 1108 may be one of the biometrically-enhanced verifiable credentials 800 or the biometrically-enhanced verifiable credentials 900. Additionally, in some examples, the verifiable credential 1108 may be a QR code or other suitable machine-readable indicia.

Figure 12:
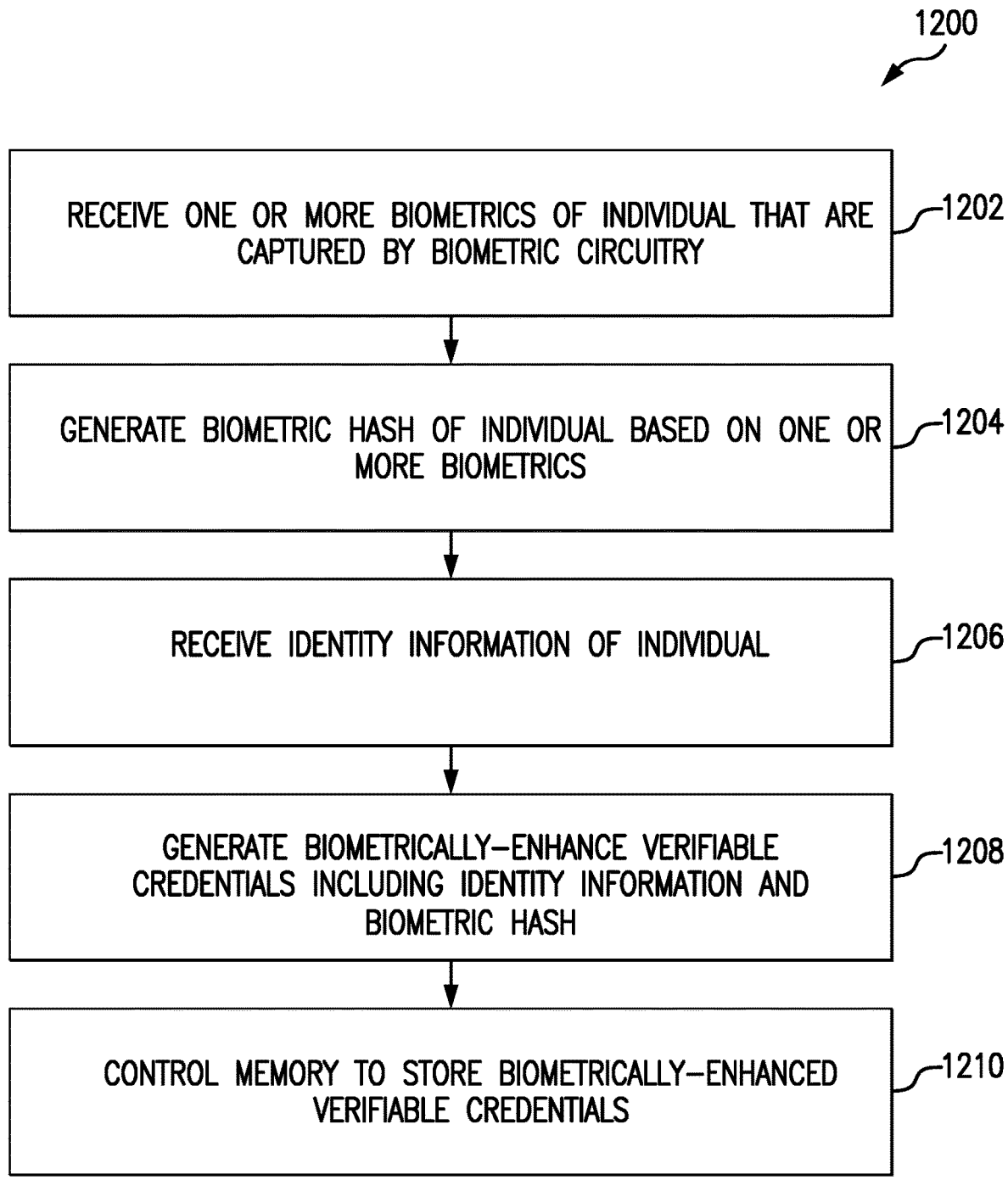
FIG. 12 is a block diagram illustrating a process for generating biometrically-enhanced verifiable credentials, in accordance with various aspects of the present disclosure.

FIG. 12 is a block diagram illustrating a process 1200 for generating biometrically-enhanced verifiable credentials, in accordance with various aspects of the present disclosure. FIG. 12 is described with respect to FIG. 1.

In the example of FIG. 12, the process 1200 includes receiving one or more biometrics of an individual that are captured by a biometric capture circuitry (at block 1202). For example, the electronic processor 122 receives one or more biometrics of an individual that are captured by the biometric capture circuitry 136.

The process 1200 includes generating a biometric token of the individual based on one or more biometrics (at block 1204). For example, the electronic processor 122 generates a biometric token of the individual based on one or more biometrics.

The process 1200 includes receiving identity information of the individual (at block 1206). For example, the electronic processor 122 receives identity information of the individual.

The process 1200 includes generating biometrically-enhanced verifiable credentials including the identity information and the biometric token (at block 1208). For example, the electronic processor 122 generates biometrically-enhanced verifiable credentials including the identity information and the biometric token.

The process 1200 also includes controlling a memory to store the biometrically-enhanced verifiable credentials (at block 1210). For example, the electronic processor 122 controls the memory 124 to store the biometrically-enhanced verifiable credentials.

In some examples, the process 1200 may further include transmitting the biometrically-enhanced verifiable credentials to a centralized server via a network. In some examples, the process 1200 may further include generating a QR code indicative of the biometrically-enhanced verifiable credentials, and controlling a display screen to display the QR code.

In some examples, the biometrically-enhanced verifiable credentials includes one or more credentials, one or more claims, and one or more proofs. In these examples, the one or more claims may include the biometric token. Additionally or alternatively, in these examples, the one or more proofs may include one or more biometric tokens of the individual at a time of presenting the biometrically-enhanced verifiable credentials.

Figure 13:
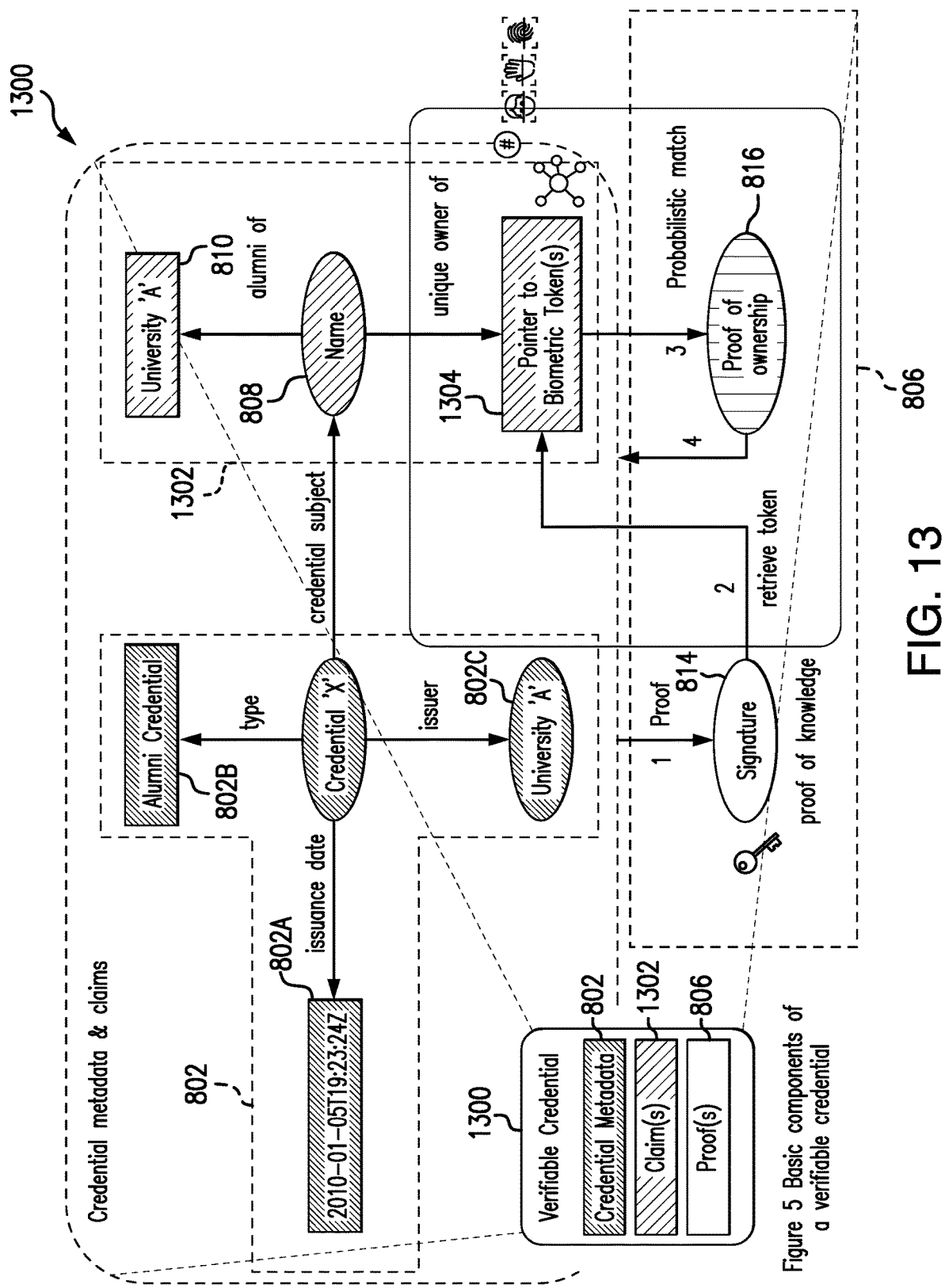
FIG. 13 is a diagram illustrating a third example structure of biometrically-enhanced verifiable credentials for payments, in accordance with various aspects of the present disclosure.

FIG. 13 is a diagram illustrating a third example structure of biometrically-enhanced verifiable credentials 1300 for payments, in accordance with various aspects of the present disclosure. As illustrated in FIG. 13, the verifiable credential 1300 includes the credential metadata 802, claim 1302, and proof(s) 806.

The claim 1302 includes the credential subject 808, the attribute 810 of the credential subject 808, and a pointer 1304. The pointer 1304 is a pointer to one or more biometric tokens. In this example implementation, the pointer 1304 is proof that the Recipient name is the unique owner of the credential metadata 802.

The pointer 1304 points to a storage location of an external biometric token that may be used to perform a probabilistic match on a presenter of the biometrically-enhanced verifiable credentials 1300. In some examples, the pointer 1304 may be a digital pointer that is internal to the verifiable credentials 1300 in the form of an SMS, text string, hyperlink, or other digital pointer. In other examples, the pointer 1304 may a physical pointer that is external the verifiable credentials 1300 in the form of a QR code or other machine-readable indicia.

Figure 14:
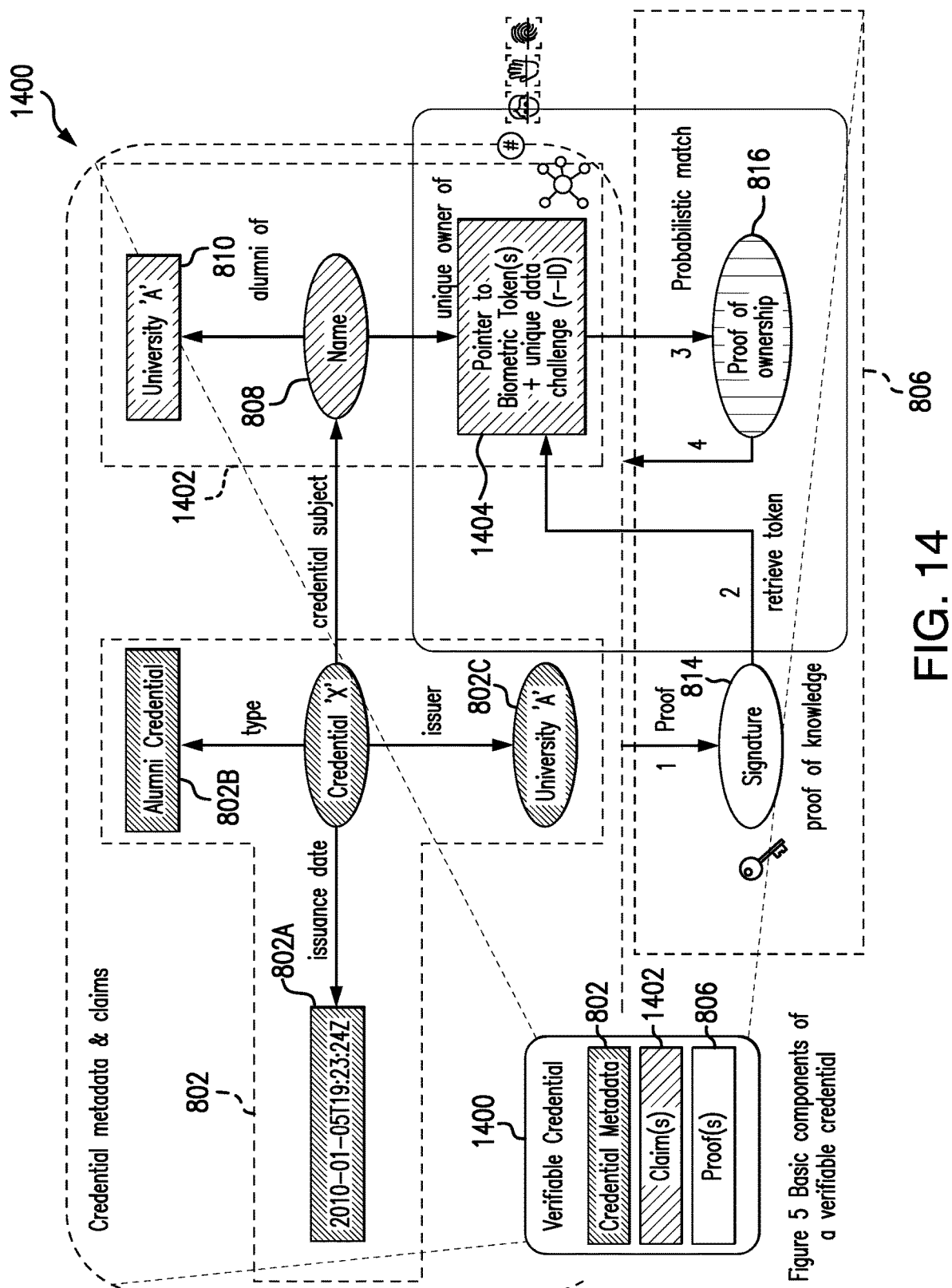
FIG. 14 is a diagram illustrating a fourth example structure of biometrically-enhanced verifiable credentials for payments, in accordance with various aspects of the present disclosure.

FIG. 14 is a diagram illustrating a fourth example structure of biometrically-enhanced verifiable credentials 1400 for payments, in accordance with various aspects of the present disclosure. As illustrated in FIG. 14, the verifiable credential 1400 includes the credential metadata 802, claim 1402, and proof(s) 806.

The claim 1402 includes the credential subject 808, the attribute 810 of the credential subject 808, and a pointer 1404. The pointer 1404 is a pointer to one or more biometric tokens and a unique data challenge. The unique data challenge is represented by a unique 'relationship identifier (r-ID)' which is dynamically computed following a successful match to a biometric token stored in the cloud (to which the 'pointer' points). That unique r-ID identifier may be embedded in the Verifiable Credential either in addition to, or in lieu of, the biometric token. Dynamic computation of the r-ID may be done multiple ways, either via salting and hashing of another unique identifier (e.g., GUID) that is linked to the biometric token in the cloud. In this example implementation, the pointer 1404 is proof that the Recipient name is the unique owner of the credential metadata 802.

The pointer 1404 points to a storage location of an external biometric token that may be used to perform a probabilistic match on a presenter of the biometrically-enhanced verifiable credentials 1400. In some examples, the pointer 1404 may be a digital pointer that is internal to the verifiable credentials 1400 in the form of an SMS, text string, hyperlink, or other digital pointer. In other examples, the pointer 1404 may a physical pointer that is external the verifiable credentials 1400 in the form of a QR code or other machine-readable indicia.

The biometrically-enhanced verifiable credentials 400-900, 1300, and 1400 have many different use cases. In a first example use case, the biometrically-enhanced verifiable credentials 400-900, 1300, and 1400 may be part of a collection of verifiable credentials issued by different authors/creators where the individual may be using different unique identifiers and/or different decentralized identifier (DID) methods.

In a second example use case, the biometrically-enhanced verifiable credentials 400-900, 1300, and 1400 may be verifiable credentials that enable an individual to ask authors/creators to re-issue verifiable credentials with a different decentralized identifier (DID) that the individual is already affiliated with. In other words, the biometrically-enhanced verifiable credentials 400-900, 1300, and 1400 may allow for adjustments in the verifiable credentials.

In a third example use case, the biometrically-enhanced verifiable credentials 400-900, 1300, and 1400 may be verifiable credentials that with respect to cryptocurrency wallets enables greater protection either against unwanted private key recovery and/or unauthorized usage by rogue actors.

In a fourth example use case, the biometrically-enhanced verifiable credentials 400-900, 1300, and 1400 may be used with zero knowledge proofs to make complex, selective disclosures from multiple verifiable credentials, which are issued by multiple creators/authors and use different DID methods and/or unique identifiers.

In a fifth example use case, the biometrically-enhanced verifiable credentials 400-900, 1300, and 1400 may be used with crypto deposits to uniquely connect money transfers from various wallets/accounts to a single unique sender. For example, 0.25 Bitcoin deposit for my car payment, followed by 0.50 Bitcoin second installment, etc. and "all this money came from me."

In a sixth example use case, the biometrically-enhanced verifiable credentials 400-900, 1300, and 1400 may be used with private keys to prove the right to use a private key. For example, in limited scenarios where the user may not be in full possession of a private key, the user may use the verifiable credentials to prove to a custodian of the private key that the user has a right to use the private key.

The six use cases above are only a subset of use cases associated with the biometrically-enhanced verifiable credentials 400-900, 1300, and 1400. This disclosure is not limited to the above six use cases and other use cases exist with respect to the biometrically-enhanced verifiable credentials 400-900, 1300, and 1400.

Thus, the present disclosure provides, among other things, biometrically-enhanced verifiable credentials. Various features and advantages of the invention are set forth in the following claims.

What is claimed is:

1. A system comprising:
   a network;
   a server including
      a first communication interface configured to communicate with the network,
      a first electronic processor, and
      a first memory including a verifiable credential collection and issuance program and a global ledger; and
   a first electronic device communicatively connected to the network,
   wherein the first electronic processor, when executing the verifiable credential collection and issuance program, is configured to receive biometrically-enhanced verifiable credentials of an individual from the first electronic device via the first communication interface and the network, the biometrically-enhanced verifiable credentials includes a biometric token, determine whether a second biometric token in a global ledger matches the biometric token, responsive to determining that the second biometric token in the global ledger matches the biometric token, control the first memory to store the biometrically-enhanced verifiable credentials in an account in the global ledger, the account including the second biometric token, and responsive to determining that all biometric tokens in the global ledger do not match the biometric token, control the first memory to create a new account in the global ledger and store the biometrically-enhanced verifiable credentials in the new account.

2. The system of claim 1, wherein the first electronic processor is further configured to receive one or more biometrics of the individual that are captured by a biometric capture circuitry;

generate a third biometric token of the individual based on the one or more biometrics, receive identity information of the individual;

generate a second biometrically-enhanced verifiable credentials including the identity information and the third biometric token; and determine whether the second biometric token in the global ledger matches the third biometric token, and responsive to determining that the second biometric token in the global ledger matches the third biometric token, control the first memory to store the second biometrically-enhanced verifiable credentials in the account in the global ledger, the account including the second biometric token, and responsive to determining that all biometric tokens in the global ledger do not match the third biometric token, control the first memory to create a second new account in the global ledger and store the biometrically-enhanced verifiable credentials in the second new account.

3. The system of claim 1, wherein the first electronic device further includes a biometric capture circuitry configured to capture one or more biometrics of the individual;

a second memory storing a digital identity application; and a second electronic processor communicatively connected to the second memory and the biometric capture circuitry, the second electronic processor, when executing the digital identity application, is configured to receive the one or more biometrics of the individual that are captured by the biometric capture circuitry, generate the biometric token of the individual based on the one or more biometrics, receive identity information of the individual, generate the biometrically-enhanced verifiable credentials including the identity information and the biometric token, and control the second memory to store the biometrically-enhanced verifiable credentials.

4. The system of claim 3, wherein the first electronic device further includes a communication interface configured to transmit the biometrically-enhanced verifiable credentials to a centralized server via the network.

5. The system of claim 3, wherein the first electronic device further includes a display screen, wherein the second electronic processor is further configured to generate a QR code indicative of the biometrically-enhanced verifiable credentials, and control the display screen to display the QR code.

6. The system of claim 1, wherein the biometrically-enhanced verifiable credentials includes one or more credentials, one or more claims, and one or more proofs.

7. The system of claim 6, wherein the one or more claims includes the biometric token.

8. The system of claim 6, wherein the one or more proofs includes one or more biometric tokens of the individual at a time of presenting the biometrically-enhanced verifiable credentials.

* * * * *